Patented June 22, 1943

2,322,309

UNITED STATES PATENT OFFICE 2,322,309

FLOCCULOSE VINYL HALIDE POLYMERS

Leslie Budworth Morgan and William McGillivray Morgan, Blackley, Manchester, England, assignors to Imperial Chemical Industries Limited, a corporation of Great Britain No Drawing. Application May 13, 1940, Serial No. 334,980. In Great Britain May 26, 1939

3 Claims. (Cl. 260—88)

The present invention relates to the manufacture of useful flocculose polymerization products.

It is known to polymerize vinyl esters in an aqueous medium containing a metallic salt of polyacrylic acid or its homologues whereby the polymerization product is obtained in spherical or lentil shaped granules. It is also known to polymerize an aqueous emulsion of a vinyl halide, said emulsions being prepared by the use of known dispersing, emulsifying, soaping or washing agents, whereby products are obtained in the form of a very finely divided sludge-like precipitate or of a latex-like liquid. In the above mentioned processes it is known to add organic softening agents or plasticizers prior to commencing polymerization. Polyvinyl halides and particularly polyvinyl chloride as prepared according to the methods of the prior art is, however, difficult to work on rubber machinery at rubber working temperature to form rubbery tough homogeneous masses.

This invention has as an object the preparation of new vinyl halide polymers. A further object is the preparation of more readily worked vinyl chloride polymers. Another object is the preparation of vinyl halide and particularly vinyl chloride polymers having advantageous physical properties. Other objects will appear hereinafter.

These objects are accomplished by the following invention which comprises flocculose vinyl halides and particularly vinyl chloride polymers and their preparation by the polymerization of vinyl halides, e. g. vinyl chloride, preferably containing a plasticizer, in agitated suspension in an aqueous solution of a particular dispersing agent, namely a polymeric acrylic or methacrylic acid or interpolymer of the same with each other or with an acrylate or methacrylate ester, said solution having dispersing power insufficient to form a true emulsion of the vinyl halide.

We have found that by carrying out the polymerization of vinyl halides in an aqueous medium containing the polymeric free acids above defined it is possible to obtain flocculose polymerization products which by virtue of their physical form are very convenient to handle in any subsequent processing operation particularly so if the polymerization be carried out in presence of plasticizing or softening agents.

According to the preferred mode of operation of the present invention we manufacture flocculose polymerization products by polymerizing while agitating and in the presence of a plasticizing agent, a vinyl halide in aqueous admixture with certain polymeric water-soluble or water-dispersible free acids namely, polyacrylic, polymethacrylic, or polymeric acids obtainable by interpolymerization of acrylic and methacrylic acids with one another or with their esters.

Polymerization can conveniently be brought about by the action of light and/or heat, and with any vinyl halide polymerization catalyst having a substantial stability towards water, e. g., inorganic per compounds or organic peroxides, for example, benzoyl peroxide or other catalyst of the kind referred to in British specification 15,271 of 1914. We prefer to carry out the polymerization operation in a closed vessel. Convenient vessels for this purpose, are, for example, autoclaves adapted to be stirred, shaken or rotated end over end since these provide means for agitating the mixture to be polymerized, which as already indicated is an important feature of the invention.

The water soluble dispersing agent of dispersing power insufficient to form a true emulsion and preferably the polymeric water-soluble or water-dispersible free acids hereinbefore defined may be introduced into the aqueous polymerization mixture at any convenient stage prior to the commencement of polymerization. For example, they may be dissolved or dispersed directly as free acids in the aqueous medium. Alternatively, for example, they may be dissolved in the aqueous medium in the form of water-soluble salts such as sodium salts and then, prior to the commencement of polymerization, converted to the free acids by addition of the appropriate amount of a mineral acid or an organic acid such as acetic acid.

The amount of such polymeric acids to be employed in any particular batch in order to obtain the desired flocculose product will of course depend on the nature of the polymeric acid and on such factors as the nature of the agitation and the ratio of aqueous and non-aqueous phases. We have found that if too small an amount of the polymeric acid is employed some of the partially plasticized vinyl chloride polymer adheres to the walls of the vessel. On the other hand the use of a large amount of the polymeric acids results in the production of fine aqueous dispersion. When by use of such an excess there is production of fine dispersion the polymer formed cannot all be readily separated and washed free from the aqueous liquor. We can say that, as a rule, the desired flocculose product is wholly produced when the aqueous phase contains from 0.25 to 5.0% of the polymeric acid. Thus, for instance, following the procedure described in Example 2 below, the aqueous phase, to give the flocculose polymer in the best form for subsequent handling, should contain 3.0% of polymethacrylic acid; whereas, following the procedure described in Example 1 the best results are obtained with about 0.5% of the interpolymeride of 1 part of methyl methacrylate and 3 parts of methacrylic acid in the aqueous phase.

The plasticizing agent (or, as an alternative term, softening agent) may be admixed with the monomeric vinyl halide or with the aqueous medium or with a mixture of the two at any convenient stage prior to commencement of polymerization. As plasticizers there come into consideration, any plasticizer for polymeric vinyl halides, for example, organic phosphoric esters, such as tricresyl or triphenyl phosphates or phthalic esters such as, for example, di-n-butyl phthalate, dilauryl phthalate, and butyl phthalyl butyl glycollate. Some other substances, already known in commerce as plasticizers, for instance, chlorinated diphenyl, may also be used. The amount of plasticizer to be added will depend in part on the nature of the plasticizer and on the uses to which the flocculose polymerization products are subsequently to be put. It is not desirable however to add excessive amounts of plasticizer such as would produce a sticky polymerization product, tending to stick, for example, to the walls of the polymerization vessel. On the other hand it is desirable that the amount of plasticizer should be sufficient to yield a polymerization product having the facility for relatively low temperature homogenization hereinafter referred to. In practice from about 10% to 25% on the weight of vinyl halide is a convenient and preferred amount of plasticizer but the invention is not necessarily limited to these amounts.

The more detailed practice of the invention is illustrated by the following example, wherein parts given are by weight. There are of course many forms of the invention other than these specific embodiments.

Example 1

Seven (7) parts of the sodium salt of an interpolymerization product of 75 parts methacrylic acid and 25 parts of methyl methacrylate is dissolved in 1400 parts of water. Four and one half (4.5) parts of acetic acid is then added and the resulting aqueous solution of polymeric free acid is charged together with 120 parts of di-n-butyl phthalate, 480 parts of vinyl chloride and 2.4 parts of benzoyl peroxide into an autoclave equivalent in capacity to 3000 parts of water and adapted to be rotated end over end at about 35–40 revolutions per minute. The sealed autoclave is rotated for 3 days in a water bath heated to 55° C. The aqueous polymerization mixture is then removed and the solid filtered from the clear aqueous liquor, washed with water and dried. The resulting polymerization product is obtained as a flocculose white mass.

The flocculose polymerization product of the above example can be homogenized to a smooth, translucent, sheet, non-brittle at atmospheric temperature by milling it for a short time on a roller mill at 90° to 110° C. By adding tricresyl phosphate (in a proportion of 16 parts to 100 parts of polymerization product) and milling further between rolls at 90° to 100° C. a tough, rubbery, homogeneous sheet is obtained which has a tensile strength of 229 kilos/cm.$^2$ and which is a suitable material for extrusion into shaped masses or for application to textile fabrics by hot calendering.

Example II 750 parts of an aqueous solution of polymethacrylic acid (3%, so containing 22.5 parts of polymethacrylic acid), 1.0 part of benzoyl peroxide, 50 parts of commercial dibutyl phthalate, and 200 parts of vinyl chloride are put into an autoclave of capacity equivalent to 1750 parts of water and adapted to be rotated end over end at about 35–40 revolutions per minute. The autoclave is closed and rotated in a water bath heated to 55° C. for 72 hours. The polymerization mixture is then removed and the solid filtered from the clear aqueous liquor, washed with water and dried. The product resembles that obtained in Example 1.

When polyacrylic acid is used instead of polymethacrylic acid in the above example, similar results are obtained.

Example III 800 parts of aqueous solution of polymethacrylic acid (3%, so containing 24 parts of polymethacrylic acid), 0.8 part of benzoyl peroxide, 40 parts of commercial dibutyl phthalate, and 160 parts of vinyl chloride are treated in the way described in Example 2. Here also the polymer is separated and washed in the same manner as in Example 2, but it is found that the filtration is slower.

When for the aqueous phase there is used a less concentrated polymethacrylic acid solution, for instance, 1% or even 0.5%, filtration is speedier. All the so-obtained products are flocculose, and in physical properties and behaviour resemble closely the product of Example 1.

Example IV 5.25 parts of an interpolymeride of methacrylic acid and methyl methacrylate (3:1) and 3.5 parts of glacial acetic acid are dissolved in 700 parts of water. This solution is put into an autoclave similar to that employed in Example 2 together with 1.425 parts of benzoyl peroxide, 15 parts of commercial dibutyl phthalate and 285 parts of vinyl chloride. The polymerization is conducted as in Example 1 and the product separated in the same way.

The dry flocculose product so obtained contains 5% of plasticizer. To 100 parts 38 parts of tricresyl phosphate was added, milling as described in Example 1 except that a somewhat higher temperature than 90–100° C. was required at the start. A similar tough rubbery material was obtained.

When in the above example the proportions were changed to that instead of 5% of plasticizer there was 30% (and with 1.05 parts of benzoyl peroxide instead of 1.425 parts so that the proportion of catalyst to monomeric vinyl chloride remained constant) then a flocculose product was obtained which could be milled and worked up with more plasticizer, as described, at a temperature of 90–100° C., to give a sheet material with good tensile strength. But when the proportions were changed so that there was 50% of plasticizer present then a mass was obtained which could not be dealt with as described. Similar results to these were obtained when instead of commercial dibutyl phthalate there was used commercial tricresyl phosphate.

The polymerization products manufactured according to the invention are pale-coloured, low density, fluffy, matted and flock-like masses to which the term flocculose can most conveniently be applied. The fibre-like or thread-like elements of these masses may vary considerably in shape and dimensions, particularly when viewed under a microscope, according to the particular conditions of polymerization employed. However, the flocculose nature of the masses as judged by feel and by the naked eye is characteristic of the invention. The flocculose polymerization porducts have the advantage that they can readily be worked up into homogeneous masses such as sheets. It is well known that polyvinyl chloride, when mixed in powder form with a plasticizer of softening agent, is difficult to work into a tough, rubbery homogeneous mass free from brittleness except by the use of relatively high temperatures. Thus, if it is desired to homogenize such a mixture by kneading or masticating between heated rollers and the like it is necessary to employ temperatures in the region of 130–150° C. The flocculose polymerization products of the present invention can be homogenized, with addition of further plasticizers as desired, into tough rubbery masses such as sheets at relatively low temperatures such as 100–110° C. This is a great advantage since usual rubber-compounding machinery working at customary rubber-compounding temperatures can thus be employed. Moreover, the lower homogenizing temperatures so made possible minimize any tendency of polymerized vinyl halides to decompose.

The flocculose polymerization products of the present invention are particularly useful when homogenized into rubbery masses as indicated above for hot extrusion into shaped masses and also for hot calendering on to the surface of textile fabrics and the like to give desirable finishes.

The above description and examples are intended to be illustrative only. Any modification of or variation therefrom which conforms to the spirit of the invention is intended to be included within the scope of the claims.

What is claimed is:

1. Process for the preparation of flocculose polymers of vinyl halides which comprises agitating in a closed system and polymerizing the vinyl halide essentially free from other polymerizable materials in an aqueous solution containing 0.25 to 5.0% of a polymeric water soluble acid of the class consisting of polymeric acrylic acid, polymeric methacrylic acid and interpolymers of at least one of said acids with an ester of one of said acids.

2. Process for the preparation of flocculose polymers of vinyl chloride which comprises agitating in a closed system and polymerizing the vinyl chloride essentially free from other polymerizable materials in an aqueous solution containing 0.25 to 5.0% of a polymeric water soluble acid of the class consisting of polymeric acrylic acid, polymeric methacrylic acid and interpolymers of at least one of said acids with an ester of one of said acids.

3. Process of claim 2 wherein a plasticizer for polymeric vinyl chloride is present to the amount of 10–25% based on the weight of the vinyl chloride.

LESLIE BUDWORTH MORGAN.
WILLIAM McGILLIVRAY MORGAN.